(12) United States Patent
Linsky et al.

(10) Patent No.: US 8,392,810 B2
(45) Date of Patent: Mar. 5, 2013

(54) MAJORITY VOTE ERROR CORRECTION

(75) Inventors: Joel Linsky, San Diego, CA (US); Sang-Uk Ryu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 535 days.

(21) Appl. No.: 12/693,214

(22) Filed: Jan. 25, 2010

(65) Prior Publication Data

US 2011/0185248 A1 Jul. 28, 2011

(51) Int. Cl.
*G08C 25/02* (2006.01)
*H04L 1/18* (2006.01)
*G06F 11/00* (2006.01)

(52) U.S. Cl. .................................. 714/797; 714/748
(58) Field of Classification Search .................. 714/748, 714/749, 776, 797
See application file for complete search history.

(56) References Cited

U.S. PATENT DOCUMENTS

| | | | | |
|---|---|---|---|---|
| 3,760,371 | A * | 9/1973 | Pitroda et al. ................. | 714/797 |
| 4,887,162 | A * | 12/1989 | Arai ............................. | 358/400 |
| 5,321,703 | A | 6/1994 | Weng | |
| 5,745,502 | A * | 4/1998 | Khayrallah et al. .......... | 714/751 |
| 5,870,406 | A | 2/1999 | Ramesh et al. | |
| 5,968,197 | A * | 10/1999 | Doiron ......................... | 714/748 |
| 6,052,812 | A * | 4/2000 | Chen et al. ................... | 714/751 |
| 6,301,681 | B1 * | 10/2001 | Chen et al. ................... | 714/751 |
| 6,523,148 | B1 * | 2/2003 | Junghans ...................... | 714/797 |
| 7,218,680 | B1 | 5/2007 | Nafie et al. | |
| 2009/0074046 | A1 * | 3/2009 | Huang et al. ................. | 375/227 |
| 2009/0282298 | A1 * | 11/2009 | Zopf et al. .................... | 714/701 |

FOREIGN PATENT DOCUMENTS

| | | |
|---|---|---|
| WO | WO9221085 A1 | 11/1992 |
| WO | WO9837660 A1 | 8/1998 |

OTHER PUBLICATIONS

Uhlemann, E.; Willig, A.; , "Hard decision packet combining methods for industrial wireless relay networks," Communications and Electronics, 2008. ICCE 2008. Second International Conference on , vol., No., pp. 104-108, Jun. 4-6, 2008.*
Brian Jenkins "Why synchrounous for Wireless" Sky Pilot Networks Dec. 8, 2008 http://skypilot.trilliantinc.com/pdf/wp_WhySynchronousForWireless.pdf.*
Bluetooth Specification Version 3.0 + HS, published Apr. 21, 2009, vol. 1, p. 53 and vol. 2, pp. 104-105, 121-122, 142-147, 167-169, and 297-301.

(Continued)

*Primary Examiner* — Cynthia Britt
(74) *Attorney, Agent, or Firm* — Espartaco Diaz Hidalgo

(57) ABSTRACT

In general, techniques are described for performing majority vote error correction techniques. In operation, a communication device comprising a control unit implements the majority vote error correction techniques. The control unit includes a link management module to request a first retransmission of a first communication received over a wireless communication medium in response to detecting a first uncorrectable error in the first communication, requests a second retransmission of the first communication in response to detecting a second uncorrectable error in a second communication received in response to the first retransmission request and receives a third communication in response to the second retransmission. The control unit also includes a majority vote module to, in response to detecting a third uncorrectable error in the third communication, perform a bit-wise majority vote on corresponding bits of the first, second and third communications to generate an error-corrected communication.

30 Claims, 6 Drawing Sheets

OTHER PUBLICATIONS

Bluetooth Special Interest Group (SIG): "Blue Tooth Specification Version 3.0 + HS", vol. 2 Apr. 21, 2009, pp. 1-976, XP002628884, Retrieved from the Internet: URL:https://www.bluetooth.org/Technical/specifications/adopted.htm [retrieved on Mar. 15, 2011] cited in application part B; p. 57-p. 204 part E, section 5.4;p. 409-418.

International Search Report—PCT/US2010/061917—International Search Authority, European Patent Office, Apr. 6, 2011.
Wu Cheng-Shong, et al., "Majority decoded automatic repeat request error control schemes", 19881128;19881128-19881201, Nov. 28, 1988, pp. 1648-1652, XP010071843, p. 1, col. 1-2.

* cited by examiner

MAJORITY VOTE ERROR CORRECTION

TECHNICAL FIELD

The disclosure relates to communicating data and, more particularly, communicating data over a noisy medium.

BACKGROUND

Data communications have evolved over time to make use of a number of different communication mediums. A copper wire communication medium, for example, was originally used to communicate voice data from one telephone to another in a plain old telephone system (POTS). As applications arose that required more bandwidth, additional communication mediums, such as co-axial cable and fiber, were developed to support delivery of the increasing data traffic. Recently, with the development of portable devices, wireless or over-the-air communication involving both long-range (e.g., 5-10 miles) and short-range (e.g., 30 to 100 feet) communication of data have been developed to permit the portability of these applications. Further, cords and other fixed communication means that restrict movement have been replaced with wireless data communication to remove these restrictions and improve mobility.

Wireless data communication typically involves transmitting data as a signal of one or more frequencies which propagates through the air, which in effect represents a wireless communication medium where the specific frequencies are commonly referred to as channels. Unfortunately, many electrical devices are not properly shielded and, as a result, may "leak" signals into the designated wireless channels. These leaked signals constitute noise in these wireless communication channels used for wireless data communication. This noise may impact the quality of communication over the wireless communication channel resulting in errors when a receiving device recovers the data from these noisy wireless communication channels. As many applications, such as wireless headsets used with cellular phones, require mostly error free data to accurately reproduce a telephone conversation, these errors may substantially impact a perceived quality of a given application.

SUMMARY

In general, this disclosure describes techniques for communicating data over a noisy communication medium, such as a wireless communication medium. The techniques involve retransmission of an originally received data packet or other discrete data unit in response to detecting uncorrectable errors in the originally received data packet resulting from transmission over the noisy communication medium. If this first retransmission of the data packet also includes uncorrectable errors due to communication over the noisy communication medium, the techniques provide for a second retransmission of the originally received data packet, such that three different versions of the original packet are received. If the third version of the data packet resulting from the second retransmission includes uncorrectable errors, the techniques involve a bit-wise majority vote by which to determine, with relatively high probability, the original data packet. The bit-wise majority vote compares the bits, in sequential order, between the three versions of the data packet and, for each bit position, takes the majority bit value as the "correct" value.

The majority vote techniques of this disclosure promote error-correction in communication systems that lack full forward error correction (FEC) or other embedded error correction mechanisms with respect to one or more portions of a data packet. The techniques therefore provide error correction for the entire packet, including those portions not protected by any imbedded error correction mechanism. As a result of these techniques, data communications over noisy communication mediums may be improved as the techniques may substantially reduce bit error rates. For data communications involving voice or other streaming audio data, the techniques promote improved audio quality over systems that do not employ the techniques described in this disclosure.

In one aspect, a method comprises requesting, with a communication device, a first retransmission of a first communication received over a wireless communication medium in response to detecting a first uncorrectable error in the first communication and requesting, with the device, a second retransmission of the first communication in response to detecting a second uncorrectable error in a second communication received in response to the first retransmission request. The method also comprises receiving, with the device, a third communication in response to the second retransmission and, in response to detecting a third uncorrectable error in the third communication, performing, with the device, a bit-wise majority vote on corresponding bits of the first, second and third communications to generate an error-corrected communication.

In another aspect, a communication device comprising a control unit that includes a link management module to request a first retransmission of a first communication received over a wireless communication medium in response to detecting a first uncorrectable error in the first communication, requests a second retransmission of the first communication in response to detecting a second uncorrectable error in a second communication received in response to the first retransmission request and receives a third communication in response to the second retransmission. The control unit also includes a majority vote module to, in response to detecting a third uncorrectable error in the third communication, perform a bit-wise majority vote on corresponding bits of the first, second and third communications to generate an error-corrected communication.

In another aspect, a system comprises a first wireless personal area network (WPAN) device and a second WPAN device. The first WPAN device comprises a control unit that includes a link management module to request a first retransmission of a first communication received over a wireless communication medium in response to detecting a first uncorrectable error in the first communication, requests a second retransmission of the first communication in response to detecting a second uncorrectable error in a second communication received in response to the first retransmission request and receives a third communication in response to the second retransmission. The control unit of the first WPAN device also includes a majority vote module to, in response to detecting a third uncorrectable error in the third communication, perform a bit-wise majority vote on corresponding bits of the first, second and third communications to generate an error-corrected communication. The first WPAN device wirelessly communicates over the wireless communication medium with the second WPAN device.

In another aspect, a computer-readable storage medium comprises instructions that cause a processor to request a first retransmission of a first communication received over a wireless communication medium in response to detecting a first uncorrectable error in the first communication, requesting a second retransmission of the first communication in response to detecting a second uncorrectable error in a second communication received in response to the first retransmission request, receiving a third communication in response to the second retransmission and, in response to detecting a third uncorrectable error in the third communication, performing a bit-wise majority vote on corresponding bits of the first, second and third communications to generate an error-corrected communication.

In another aspect, a communication device comprises means for requesting a first retransmission of a first communication received over a wireless communication medium in response to detecting a first uncorrectable error in the first communication and means for requesting a second retransmission of the first communication in response to detecting a second uncorrectable error in a second communication received in response to the first retransmission request. The communication device also comprises means for receiving a third communication in response to the second retransmission, and in response to detecting a third uncorrectable error in the third communication, means for performing a bit-wise majority vote on corresponding bits of the first, second and third communications to generate an error-corrected communication.

The details of one or more aspects of the techniques are set forth in the accompanying drawings and the description below. Other features, objects, and advantages of the techniques will be apparent from the description and drawings, and from the claims.

DETAILED DESCRIPTION

Figure 1:
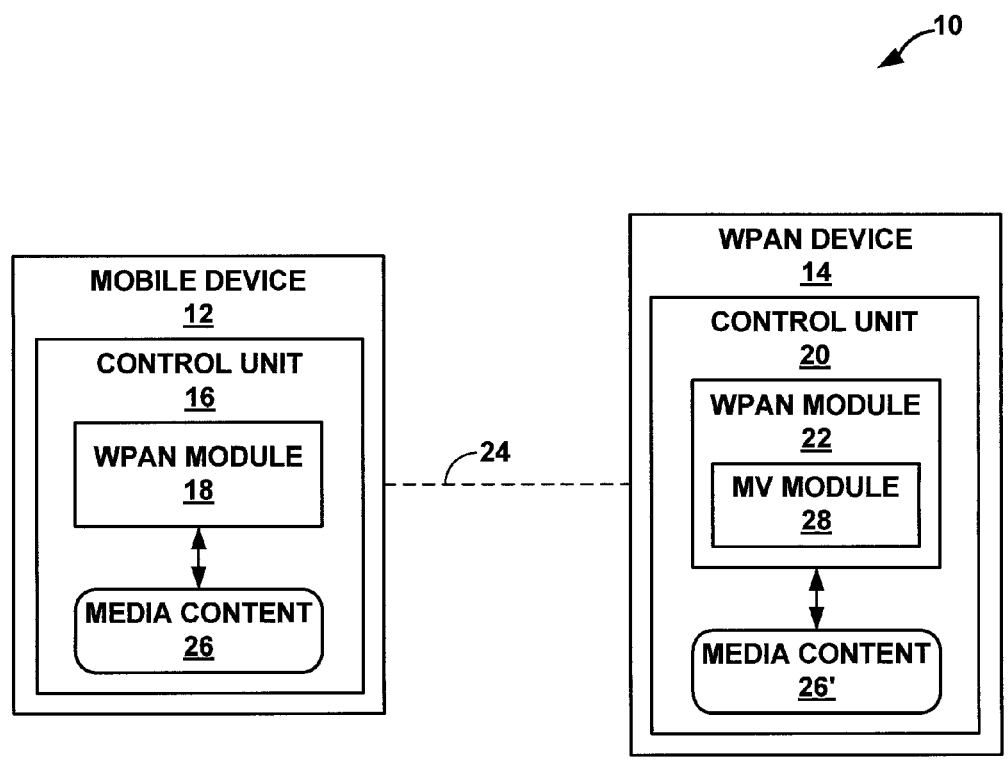
FIG. 1 is a block diagram illustrating an example wireless communication system that implements the majority vote error correction techniques described in this disclosure.

This disclosure is directed to error correction techniques for correcting errors detected in data communications sent over a noisy communication medium, such as a wireless communication medium. A wireless communication medium denotes a medium through which communication occurs without the use of wires or other physical communication mediums. Often, wireless communication involves transmitting or broadcasting signals at one or more or a range of designated frequencies that are typically set aside for such wireless communication. In other instances, wireless communication involves transmitting or broadcasting signals over a plurality of frequencies, each of the frequencies in a different range. This latter form of wireless communication is referred to as "spread spectrum" wireless communication that spreads the signal over a range or spectrum of different frequency ranges.

A wireless communication specification, standard or protocol, referred to as Bluetooth™, implements wireless communication using a specific type of spread spectrum data communication referred to as a "frequency-hopping" spread spectrum. This frequency-hopping spread spectrum divides the data being communicated over the wireless communication medium into discrete portions and transmits each of these portions as a signal of up to 79 different frequencies. Typically, Bluetooth communication supports a maximum transmission distance of 10 meters, which is about 30 feet. Bluetooth™ communication further provides for synchronous connection oriented links (referred to as "SCO" in the Bluetooth™ specification), where a first device connects (or "pairs" in the terminology of the "Bluetooth™ specification) with a second device. The connection is synchronous in that the two devices synchronize, time-wise, data communications between each other to permit transmission of data for time-sensitive or time-bounded applications, such as voice applications including Voice over Internet Protocol (VoIP) and more standard, cellular telephone calls.

In later revisions to the Bluetooth™ specification, another form of link referred to as an extended synchronous connection oriented links (referred to as "eSCO" in the Bluetooth™ specification) was defined to improve upon SCO. SCO did not allow retransmission of communications in response to detecting an error in these transmissions and instead provided only limited forms of error correction. Failing error correction, SCO replaced the erroneous data communication with a special communication that in effect defined silence. eSCO improved upon SCO by enabling retransmission of those erroneous data communications that could not be remedied through the limited forms of error correction. For practical purposes, eSCO limited retransmission to two distinct retransmissions of the erroneous data communication.

In accordance with one aspect of the techniques of this disclosure, a first device, such as a Bluetooth™ headset, implements the eSCO aspect of the Bluetooth™ specification or protocol to request two retransmissions of a data communication received over an eSCO link between the headset and a second device, such as a cellular or mobile phone. The headset therefore receives a first communication over the eSCO link and performs error detection to determine whether the first communication includes an error. If the first communication includes an error, the headset may first attempt to correct the error. Assuming, however, that the error cannot be corrected, the headset requests a first retransmission of the first communication received over the wireless communication medium, e.g., the eSCO link, in response to detecting the error in the first communication.

The headset then receives another, or second, communication in response to this first requested retransmission. The headset determines whether the second communication received in response to the first retransmission request includes an error. Assuming this second communication contains an error that cannot be corrected, the headset requests a second retransmission of the first communication in response to detecting an error in the second communication received in response to the first retransmission request. The headset receives a third communication in response to the second retransmission and determines whether the third communication contains an error that cannot be corrected.

In response to detecting another such uncorrectable error in the third communication, the headset, rather than replace the third communication in an output buffer with the special communication designating silence or otherwise perform packet loss concealment, performs a bit-wise majority vote on corresponding bits of the first, second and third communications to generate at least a partially error-corrected communication. The headset performs the bit-wise majority vote by comparing, for example, the first bit of a payload of each of the first, second and third communications, which for illustrative purposes may comprise bit values of 1, 1 and 0, respectively. As the two 1's form a majority, the first device selects "1," thereby implementing a bit-wise majority vote to correct the assumed "0" error in the third communication. This majority process may be performed for each bit of a respective communication payload.

By performing this additional error correction step that involves leveraging the retransmission enhancement of eSCO in place of substituting a special communication designating silence for the third communication, the techniques may substantially improve the quality of communication over an eSCO link compared to the quality experienced over eSCO links that implement the standard eSCO substitution of the special silence communication for the erred third communication. Moreover, the error correction techniques described in this disclosure may be implemented to comply with existing Bluetooth™ protocol specifications and therefore do not require any substantive amendment of the Bluetooth™ specification. As a result, the techniques may be implemented in existing Bluetooth™ capable devices without encountering Bluetooth™ compliance issues.

While the techniques are described in this disclosure with respect to the Bluetooth™ protocol specification for purposes of illustration, the techniques may be implemented with respect to any form of communication that relies on retransmission for overcoming communications received with detected errors. In this and many other aspects, the techniques should not be limited to the example set forth below.

FIG. 1 is a block diagram illustrating an example wireless communication system 10 that implements the majority vote error correction techniques described in this disclosure. Wireless communication system 10 includes a mobile device 12 and a wireless personal area network device 14 ("WPAN device 14"). Mobile device 12 comprises one or more of a cellular telephone (including so-called "smart" phones), a wireless telephone, a laptop computer, a personal digital assistant (PDA), a so-called "netbook," a portable or personal media player (including so-called "MP3" players), or any other device of a portable nature capable of implementing a wireless communication protocol or standard. While described with respect to mobile device 12, the techniques may be implemented with respect to non-mobile or less portable devices, such as desktop computers, workstations, non-portable media players (including wired media players, such as digital video disc players, Bluray™ disc players, and audio/video receivers), televisions, or any other device of a non-mobile or less portable devices capable of implementing a wireless communication protocol or standard.

WPAN device 14 may comprise any device capable of implementing a WPAN protocol, such as a Bluetooth™ protocol, infrared data association (IrDA) standards regarding infrared communications, and ultra-wideband (UWB) specifications. For illustrative purposes, it is assumed that WPAN device 14 implements the Bluetooth™ specification. Common WPAN devices 14 that implement the Bluetooth™ protocol include wireless headsets, wireless computer pointing devices (e.g., such as a mouse), wireless keyboards, and wireless stereo headphones.

Institute of Electrical and Electronics Engineers (IEEE) 802.15, which is the fifteenth working group of IEEE 802 that specializes in WPAN standards, defined previous versions of the Bluetooth standard, but have since forgone further Bluetooth standardization. The Bluetooth special interest group (SIG) has taken over Bluetooth standardization alone and has recently released a Bluetooth specification version 3.0, entitled "Bluetooth Specification Version 3.0+HS," on Apr. 21, 2009, the entire contents of which are hereby incorporated by reference as if fully set forth herein.

Mobile device 12 includes a control unit 16 that implements the same WPAN protocol, e.g., one of the Bluetooth specifications, as that implemented by WPAN device 14. More specifically, control unit 16 includes WPAN module 18 that implements the same WPAN protocol, e.g., the Bluetooth™ specification, as that implemented by WPAN device 14. WPAN device 14 also includes a control unit 20 that implements the same WPAN protocol, e.g., the Bluetooth™ specification, as that implemented by mobile device 12. In particular, control unit 20 includes a WPAN module 22 that implements the same WPAN protocol, e.g., the Bluetooth™ specification, as that implemented by mobile device 12.

Each of mobile device 12 and WPAN device 14 implement the same WPAN protocol so as to "pair" with one another using procedures set forth in the Bluetooth™ specification. "Pairing" involves establishing a wireless communication channel or link 24 between each of WPAN modules 18 and 22. This wireless communication channel or link 24 represents a wireless communication medium. There are a variety of different types of links that WPAN modules 18 and 22 may establish, including asynchronous and synchronous links. WPAN modules 18 and 22 typically select the type of link based on the requirements of a particular application. For example, for voice applications, such as a voice over Internet Protocol (VoIP) application, WPAN modules 18 and 22 generally establish a synchronous link 24. For purposes of illustration, it is assumed that WPAN modules 18 and 22 establish a synchronous wireless communication link 24. The techniques of this disclosure, however, should not be limited to synchronous wireless communication link 24.

The Bluetooth™ specification provides for different types of synchronous wireless communication links. A first type referred to as a synchronous connection oriented (SCO) link involves transmitting data units over the SCO link that include limited error correction. In instances where the error correction for the SCO link is insufficient to correct the error, SCO links provide a special "silence" data unit for use in replacing the erred data unit. The "silence" data unit, when applied to auto data units, represents silence in the audio stream being communicated between the two WPAN devices. Originally, silence was perceived as an improvement over an erred data unit. However, as noted above, the Bluetooth™ specification was revised to include a different type of synchronous wireless communication link, referred to as an extended synchronous connection oriented (eSCO) link in the Bluetooth™ specification.

These eSCO links provided for a retransmission mechanism to account for erred data communications and only indicates silence as a last resort. To illustrate, upon detecting errors in a data unit where the limited error correction proved insufficient to correct the errors, those WPAN devices that adhered to the revised Bluetooth specification requested retransmission of the data unit. If the receiving WPAN device detected uncorrectable errors in the retransmitted data unit, this device would then request retransmission once again of the data unit. If the receiving WPAN device once again detected uncorrectable errors in the retransmitted data unit, the WPAN device would only then replace the data unit with the special "silence" data unit. The data unit typically comprises a packet containing audio data, but may comprise any other type of application layer data.

The transition from SCO to eSCO links arose mainly due to the rise in interference in wireless communication channels. Increasing numbers of both wired and wireless devices are being used, where unshielded wired devices may "leak" or otherwise generate electrical signals that cause interference in the same frequencies used for the SCO links and other wireless devices may overrun the frequencies used for the SCO links. Consequently, these wireless communication channels or links are "noisy" in the sense that static or other interference may introduce random signals of the same frequency bands as those reserved to communicate over established synchronous wireless communication link 24. By providing for two retransmissions of the original data unit in eSCO links, the probability of receiving an error-free packet is greatly increased.

Notably, the current version of the Bluetooth™ specification (version 3.0) provides forward error correction (FEC) only for the header of the data unit and not for the actual payload where the audio or other data is stored. For the payload, the current version of the Bluetooth™ specification provides only for error detection through the use of a cyclic redundancy check (CRC). In this sense, the Bluetooth™ specification provides for "limited" error correction, as only errors in the header can be corrected while errors in the payload can only be detected. Thus, according to the Bluetooth™ specification, retransmission is the only means by which errors in the payload may be "corrected," where this form of correction is far different than the dynamic correction of the same data unit enabled through FEC. That is, FEC actually corrects the errors in the same data unit, while the retransmission corrects the errors of the current data unit by replacing the current data unit with another version of the data unit, which may or may not include errors.

Given the synchronous nature of these eSCO links, the Bluetooth™ specification provides for a limited time window in which each data unit may be sent between WPAN modules 18 and 22. Typically, this limited time window permits only two retransmissions of the data unit, meaning that WPAN module 22 may only request two retransmissions before having to flush the payload from the queue, which may be the same as replacing the data unit with the special "silence" data unit. Moreover, once this time expires (or, in other words, a "timeout" of a timer occurs), WPAN module 22 may not even response with an acknowledgement to the received data unit, as the synchronous nature of link 24 would require both of WPAN modules 18 and 22 to timeout at the same time and remain synchronous.

In accordance with the techniques described in this disclosure, WPAN device 14, which as described above may represent a Bluetooth™ headset, implements the eSCO aspect of the Bluetooth™ specification or protocol to request two retransmissions of a data unit or communication received over an eSCO link between WPAN device 14 and mobile device 12, which may represent a cellular or mobile phone. However, rather than simply replace the last data communication having an uncorrectable error with a special silence data unit or otherwise performing packet loss concealment, WPAN device 14 performs a bit-wise majority vote when appropriate on each of the bits of the three separate versions of the same data communication. Empirical research has demonstrated that performing a bit-wise majority vote may significantly improve the audio quality of media content 26' received by WPAN device 14 when played back to a listener.

To illustrate these techniques, consider that mobile device 12 initially pairs with WPAN device 14 to establish a synchronous wireless communication link 24, which is also referred to as eSCO link 24 for ease of reference. More particularly, WPAN module 18 of mobile device 12 pairs with WPAN module 22 of WPAN device 14. Mobile device 12 may initiate a voice telephone call either through the cellular network or through a data network, where in the instance of the data network the call represents a VoIP call. Alternatively, mobile device 12 may begin audio or video data playback or stream audio or video data from a wireless network. In any event, control unit 16 may access and decode media content 26, where control unit 16 stores media content 22 to a memory or other storage medium (not shown in FIG. 1). WPAN module 18 then begins transmitting this media content 26 via eSCO link 24 to WPAN module 22 of WPAN device 14, which may include other modules not shown in FIG. 1 for playing back the received media content.

In accordance with the Bluetooth specification, WPAN module 18 divides media content 22 into discrete data units, which are referred to in the Bluetooth™ specification as eSCO packets. While described with respect to eSCO packets, the techniques may apply to any data communication or data unit and should not be limited to eSCO packets. WPAN device 14 and, more particularly, WPAN module 22 of WPAN device 14 therefore receives a first eSCO packet over eSCO link 24 and performs error correction/detection to determine whether the first eSCO packet includes an error. If the first eSCO packet includes an error, WPAN module 22 may first attempt to correct the error. Assuming, however, that the error cannot be corrected, WPAN module 22 requests, in accordance with the Bluetooth™ specification, a first retransmission of the first eSCO packet received over the wireless communication medium, e.g., eSCO link 24, in response to detecting the error in the first eSCO packet. WPAN module 18 responds to this first retransmission request with another or second eSCO packet that is a duplicate or copy of the first eSCO packet from the perspective of WPAN module 18.

WPAN module 22 then receives another, or second, eSCO packet in response to this first requested retransmission from WPAN module 18. WPAN module 22 determines whether the second eSCO packet received in response to the first retransmission request includes an error. Assuming this second communication contains an error that cannot be corrected, WPAN module 22 again requests a second retransmission of the first eSCO packet in response to detecting an uncorrectable error in the second communication received in response to the first retransmission request. Once again, WPAN module 18 of mobile device 12 responds to the second retransmission request with a duplicate or copy, form the perspective of WPAN module 18, of the first eSCO packet. WPAN module 22 receives a third eSCO packet from WPAN module 18 of mobile device 12 in response to the second retransmission and determines whether the third eSCO packet contains an uncorrectable error.

In response to detecting yet another uncorrectable error in the third eSCO packet, WPAN module 22 of WPAN device 14, rather than replace the third eSCO packet in an output buffer with the special communication designating silence, invokes majority vote (MV) module 28 ("MV module 28") when appropriate, where MV module 28 performs a bit-wise majority vote on corresponding bits of the first, second and third eSCO packets to generate at least a partially error-corrected eSCO packet. MV module 28 may not be invoked if the header or other information is corrupted beyond correction, as packets with these uncorrectable errors may include too many errors for correction via the techniques described in this disclosure. MV module 28 represents a hardware or combination of hardware and software (e.g., a processor executing software stored to a computer-readable storage medium) module that implements various aspect of the bit-wise majority vote techniques described in this disclosure.

MV module 28 performs the bit-wise majority vote by comparing, for example, the first bit of a payload of each of the first, second and third eSCO packets, which for illustrative purposes may comprise bit values of 1, 1 and 0, respectively. As the two 1's form a majority, MV module 28 selects "1," thereby implementing a bit-wise majority vote to correct the assumed "0" error in the third eSCO packet. MV module 28 continues on a bit-by-bit basis in the above manner to assess and correct those bits by way of the majority vote techniques described above. MV module 28 then writes this partially error corrected eSCO packet to media content 26', which may be stored to a buffer, memory or other computer-readable storage medium. Media content 26' is denoted with a prime (') to suggest that it is a copy or near copy of media content 26 stored by control unit 16 of mobile device 12.

By performing this additional error correction step that involves leveraging the retransmission enhancement of eSCO in place of substituting a special communication designating silence for the third eSCO packet, the techniques may substantially improve the quality of communication over an eSCO link compared to the quality experienced over eSCO links that implement the standard eSCO silence substitution for the erred third eSCO packet. Moreover, the error correction techniques described in this disclosure comply with existing Bluetooth™ protocol specifications and therefore do not require any substantive amendment of the Bluetooth™ specification. As a result, the techniques of this disclosure may be implemented in existing Bluetooth™ capable devices without encountering Bluetooth™ compliance issues.

Figure 2:
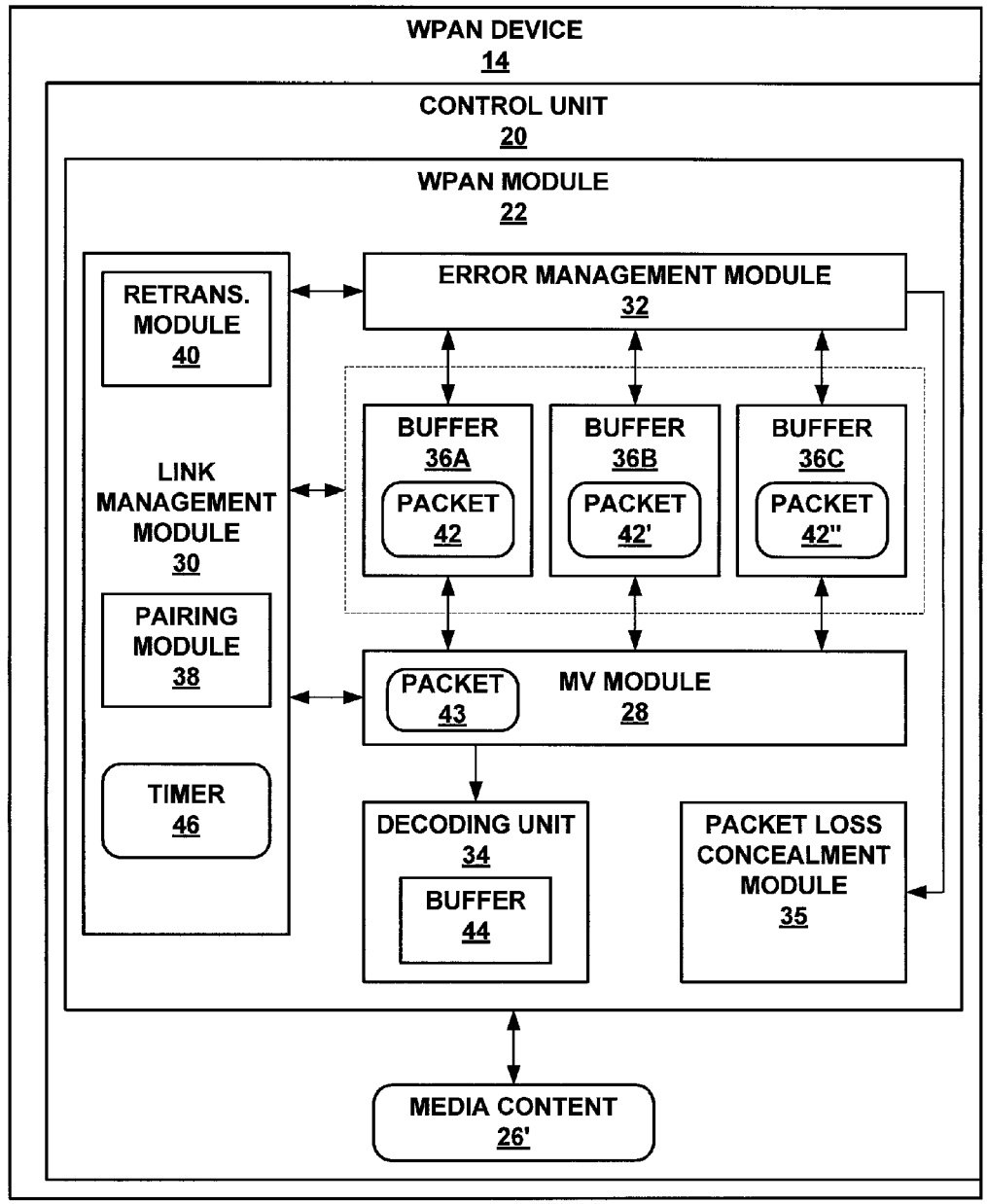
FIG. 2 is a block diagram illustrating a wireless personal area network (WPAN) device of FIG. 1 in more detail.

FIG. 2 is a block diagram illustrating WPAN device 14 of FIG. 1 in more detail. As shown in FIG. 2, WPAN device 14 includes control unit 20 comprising WPAN module 22. WPAN module 22, as described above, includes MV module 28. WPAN module 22 however also includes a link management module 30, error management module 32, decoding unit 34, packet loss concealment module 35 and buffers 36A-36C. Link management module 30 represents a hardware or combination of hardware and software (e.g., a processor executing software stored to a computer-readable storage medium) that manages a link, such as eSCO link 24 shown in FIG. 1.

Link management module 30 includes a pairing module 38 and a retransmission module 40 ("retrains module 40"). Pairing module 38 represents a hardware or combination hardware and software (e.g., a processor executing software stored to a computer-readable storage medium) that "pairs" WPAN module 22 with WPAN module 18 so as to configure, establish, and maintain a link that is either asynchronous or synchronous (e.g., eSCO link 24). Retransmission module 40 represents a hardware or combination of hardware and software (e.g., a processor executing software stored to a computer-readable storage medium) that issues requests for retransmission of a data unit or communication, such as an eSCO packet.

Error management module 32 represents a hardware or combination of hardware and software (e.g., a processor executing software stored to a computer-readable storage medium) that performs error correction and detection with respect to received data units, such as eSCO packets. Decoding unit 34 represents a module formed by hardware or a combination of hardware and software (e.g., a processor executing software stored to a computer-readable storage medium) that decodes payload data stored to payloads of eSCO packets to generate media content 26'. Packet loss concealment module 35 represents a hardware module or combination of hardware and software modules that performs packet loss concealment to conceal lost or corrupted packets. While not shown in FIG. 2, control unit 20 may include other modules, such as audio playback modules, for playing, rendering or otherwise playing back media content 26' for consumption by a user. These playback modules may comprise audio drivers, speakers and other audio playback components, as well as, displays and other video playback components.

Buffers 36A-36C ("buffers 36") represent hardware modules for storing data, such as eSCO packets. While shown as three separate buffers 36A-36C, a single memory module or disk drive may provide three separate logical, rather than physical, buffers. In this respect, buffers 36 represent any real or logical partitioning of memory or other computer-readable storage medium. Buffers 36 typically comprise small dedicated memories, such as Flash memory, random access memory (RAM), static RAM (SRAM), dynamic RAM (DRAM) or any other form of either static or dynamic memory.

Initially, a user or other operator of WPAN device 14 interacts with a user interface (not shown in FIG. 2) so as to cause pairing module 38 of link management module 30 to begin broadcasting or otherwise transmitting inquiry messages on different frequencies. WPAN module 18 of mobile device 12 may receive these inquiry messages and present devices identified by the inquiry message to the user or operator via a user interface of mobile device 12 (which also is not shown in FIG. 1 or 2). The user may select which device form the list of devices learned via the inquiry messages with which the user wants to pair to mobile device 12. Assuming the user selects WPAN device 14, WPAN module 18 pairs with WPAN module 22, where pairing module 38 negotiates the pairing process to establish a link, such as eSCO link 24.

Once paired, WPAN module 18 of mobile device 12 transmits media content 26 via established eSCO link 24 by dividing media content 26 into discrete payloads and encapsulating these payloads with a header to form one or more eSCO packets. WPAN module 18 then transmits the eSCO packets via eSCO link 24 to WPAN module 22 of WPAN device 14. Link management module 30 of WPAN module 22 included within WPAN device 14 receives a first eSCO packet 42 of the plurality of eSCO packets sent by WPAN module 18. Link management module 30 stores eSCO packet 42 to buffer 36A and signals error management module 32. Error management module 32 parses the header from eSCO packet 42 stored to buffer 36A and determines whether the header contains any bit errors. If the header includes only a few bit errors, error management module 32 performs FEC to correct these errors. However, if the parsed header contains a number of errors over a FEC threshold, error management module 32 may be unable to correct these errors using FEC and instead signal link management module 30 may request a retransmission of packet 42. Link management module 30 invokes retransmission module 40 to issue the request for retransmission of eSCO packet 42.

Assuming, however, that error management module 32 does not detect any errors in the header, error management module 32 next determines whether the payload of eSCO packet 42 contains any errors. Generally, eSCO packets, such as eSCO packets 42 provide a CRC checksum that error management module 32 utilizes to determine whether eSCO packets contain errors. If packet 42 does not include any errors, error management module 32 writes packet 42 to buffer 44 of decoding unit 34, whereupon decoding unit 34 decodes packet 42 and stores this packet as a portion of media content 26'. Buffer 44 may be substantially similar to buffers 36. In some instances, buffer 44 may be the same as buffer 36A in that this buffer 36A is the buffer that decoding unit 34 accesses to decode packets. In any event, if error management module 32 determines that packet 42 contains errors using the CRC, error management module 32 signals link management module 30, which invokes retransmission module 40 to request retransmission of eSCO packet 42.

Assuming for illustrative purposes that eSCO packet 42 contains a payload bit error and consequently that retransmission module 40 requested retransmission of eSCO packet 42, WPAN module 18 of mobile device 12 retransmits eSCO packet 42, where this retransmitted copy or duplicate of eSCO packet 42 is denoted as eSCO packet 42'. Link management module 36 receives eSCO packet 42' and stores this eSCO packet 42' to buffer 36B. Error management module 32 then performs the above described process to determine whether packet 42' includes any uncorrectable errors, which may comprise a number of bit errors in the header that exceed the FEC threshold and/or any bit errors in the payload, considering the payload CRC does not permit correction. If no uncorrectable errors exist in packet 42', error management module 32 writes packet 42' to buffer 44 of decoding unit 34, whereupon decoding unit 34 decodes packet 42' and stores this packet as a portion of media content 26'.

Assuming once again however that eSCO packet 42' contains payload bit error, error management module 32 interacts with link management module 30 to signal or flag the uncorrectable error. Link management module 30, as described above, invokes retransmission module 40, which requests retransmission of packet 42. In response to this second retransmission request, WPAN module 18 of mobile device 12 retransmits eSCO packet 42, where this retransmitted copy or duplicate of eSCO packet 42 is denoted as eSCO packet 42". Link management module 36 receives eSCO packet 42" and stores this eSCO packet 42" to buffer 36B. Error management module 32 then performs the above described process to determine whether packet 42" includes any uncorrectable errors. If no uncorrectable errors are found to exist in packet 42", error management module 32 writes packet 42" to buffer 44 of decoding unit 34, whereupon decoding unit 34 decodes packet 42" and stores this packet as a portion of media content 26'.

Yet again assuming for purposes of illustration that eSCO packet 42" is found to have at least one uncorrectable payload bit error, error management module 32 then determines whether each of packets 42, 42' and 42" are valid. The packets 42, 42' and 42" are valid if they contain only uncorrectable payload bit errors. For other uncorrectable errors, such as bit errors in the header that cannot be corrected using FEC or other error correction techniques, error management module 32 may determine that application of the majority vote techniques is not appropriate due to the high level of errors (as noted by the uncorrectable nature of the header bit errors). That is, the high level of errors refers to uncorrectable errors in the headers of the packets. Rather than invoke MV module 28 to apply the majority vote techniques described in this disclosure, error management module 32 may signal a packet loss and interact with packet loss concealment module 35 to conceal the lost packet. Packet loss concealment module 35 may, for example, generate a special silence packet to conceal the lost packet. Alternatively, packet loss concealment module 35 may generate a copy of a preceding packet to conceal the lost packet.

However, if each of packets 42, 42' and 42" are valid (e.g., do not contain uncorrectable header bit errors), error management module 32 may interact with MV module 28 to signal the uncorrectable state of all three of the payloads of packets 42, 42' and 42". MV module 28 then performs a bit-wise majority vote on each successive bit of packets 42, 42' and 42" to generate an at least partially error free packet 43. The following Table 1 provides an example of an application of the bit-wise majority vote techniques employed by MV module 28 to generate packet 43:

TABLE 1

Example Bit-Wise Majority Vote

|  | Bit-0 | Bit-1 | Bit-2 | Bit-3 | Bit-4 | Bit-5 | Bit-6 | *** | Bit-N |
|---|---|---|---|---|---|---|---|---|---|
| Packet 42 | 0 | 1 | 1 | 0 | 1 | 0 | 0 | *** | 1 |
| Packet 42' | 0 | 1 | 0 | 0 | 1 | 1 | 0 | *** | 0 |
| Packet 42" | 0 | 1 | 0 | 0 | 1 | 0 | 0 | *** | 0 |
| Majority | 0 | 1 | 0 | 0 | 1 | 0 | 0 | *** | 1 |
| Packet 43 | 0 | 1 | 0 | 0 | 1 | 0 | 0 | *** | 1 |

In the above Table 1, each of packets 42, 42', 42" and 43 includes bits 0-N. Packet 42 includes bits from 0 to N with values of 0110100 . . . 1. Packet 42' includes bits 0 to N with values of 0100110 . . . 0. Packet 42" includes bits 0 to N with values of 0100100 . . . 0. MV module 28 performs the bitwise majority vote by taking the values of each bit, such as bit-0, of each of packets 42, 42' and 42" and counting the number of bit values that are 0 and the number of bit values that are 1. In the instance of bit-2, for example, the majority bit value is 0, as there is only one bit-2 value that equals one while there are two or a majority of bit-2 values that equal zero. Consequently, MV module 28 selects the majority bit-2 value of zero as the "correct" bit-2 value for packet 43. This value is only "correct" in the sense that this value represents the correct majority. While not statistically common, it is possible that this value is incorrect bit-2 value as both packet 42' and 42" may contain a bit error at exactly the same location. For this reason, packet 43' is referred to as being an at least partially error free packet.

Notably, packets 42, 42' and 42" are separate, individual, and distinct packets and may not be construed as the same packet, as each of packets 42, 42' and 42" have their own header and payload. That is, each of packets 42, 42' and 42" do not include a single header and three separate or duplicate payloads, as is common for some conventional error correcting packet structures. Instead, each of packets 42, 42' and 42" have only limited error correction in that only the header includes error correction while the payloads of each of these packets 42, 42' and 42" have only error detection. In packet structures where the payload is repeated three times, the triplicate payloads of these conventional packets incorporate a form of majority vote error correction on a per packet basis. Using the retransmission mechanism provided by Bluetooth™ instead of providing three copies of the payload in each packet increases throughput as the payload of eSCO packets 42, 42' and 42" may store significantly more data by virtue of not having to duplicate the payload twice.

Further differences exist between the techniques of the present disclosure and these conventional packets. For example, each of packets 42, 42' and 42" are sent over an eSCO link 24, which is a baseband layer link. The term "baseband layer" refers to a physical layer in the Bluetooth™ stack, which is responsible for managing physical channels and links apart from other services like error correction, data whitening, hop selection and Bluetooth™ security. The baseband layer resides directly above the Bluetooth™ radio in the Bluetooth™ stack and essentially acts as a link controller that works with a link manager module (not shown in FIG. 2) to carry out link level routines like link connection and power control. The baseband layer is not shown in FIG. 2 for ease of illustration purposes. Instead, link management module 30 is assumed to incorporate both the functionality of the baseband (or physical) layer and the link manager module. Conventional triplicate payload packets are not sent over the baseband layer, but instead sent over other layers, such as the transport layer, network layer or any other layer besides the baseband layer.

Further, link management module 30 maintains a timer 46 that denotes a packet window in which retransmission may occur. Commonly, this window permits two retransmission. If after two retransmissions no packet is received without uncorrectable errors, link management module 30 may "flush" buffers 36 (which typically involves overwriting buffers 36 with a known or set value, such as a sequence of zeros) and receive the next eSCO packet. As eSCO link 24 is synchronous, timer 46 of link management module 30 times out at approximately the same time as the timer of sending mobile device 12, such that link management module 30 need not transmit an acknowledgement acknowledging the receipt of the third eSCO packet 42". This non-acknowledgment is substantially different than the required acknowledgement of conventional triplicate payload packet delivery schemes.

In any event, upon generating packet 43 using the majority vote error correction techniques described in this disclosure, MV module 28 writes packet 43 to buffer 44 of decoding unit 34, which decodes packet 43 and stores this packet as a portion of media content 26'. The above described playback components may read streaming media content 26' and reproduce this content 26' for consumption by a user. As noted above, the techniques may substantially improve the quality of streaming audio playback.

Figure 3:
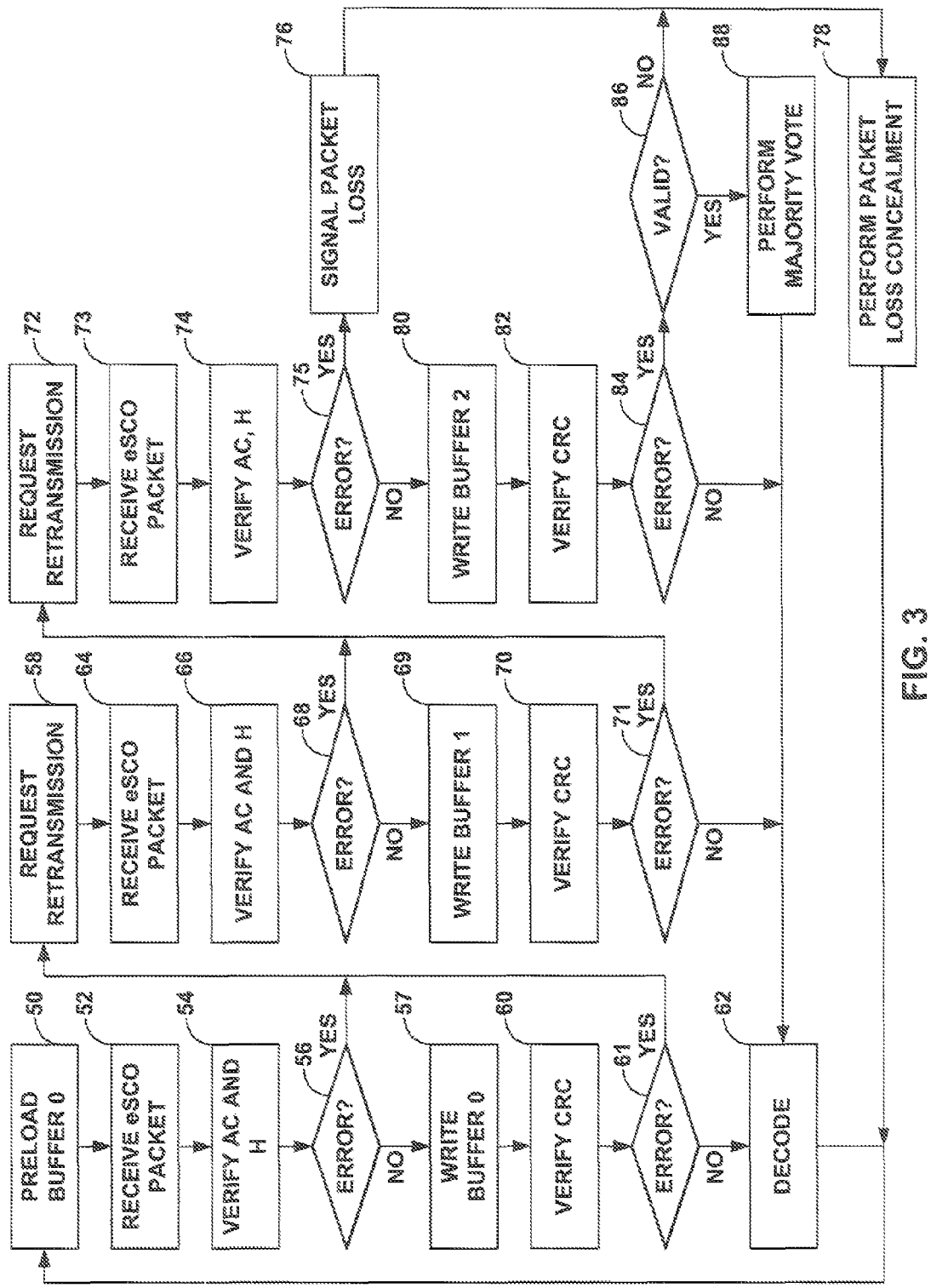
FIG. 3 is a flowchart illustrating example operation of a WPAN device in performing the majority vote error correction techniques of this disclosure.

FIG. 3 is a flowchart illustrating example operation of WPAN device 14 in performing the majority vote error correction techniques of this disclosure. Initially, link management module 30 preloads buffer 36A with a null or zero value prior to receiving an eSCO packet, such as eSCO packet 42 (50). This null write operation may be referred to as "flushing" buffer 36A, which is referred to in FIG. 3 as "buffer 0." Link management module 30 then receives eSCO packet 42 (52). Error management module 32 then verifies an access code (AC) and the Bluetooth™ header (H), and determines whether the AC or header have uncorrectable errors (e.g., errors that cannot be corrected using error correction techniques such as FEC) (54). As noted above, an eSCO packet comprises three parts, an AC, a header, and a payload and error management module 32 initially verifies the AC and H to ensure that no uncorrectable errors exist. The term "header" used above denotes any information preceding a playload in a data unit. The term "Bluetooth header" or H denotes a specific portion of a general header that comes after the AC and before the payload.

In any event, error management module verifies the header by verifying both the AC and the Bluetooth™ header (H). The AC is typically used for synchronization, DC offset compensation and identification. An out of synchronization AC, considering the synchronous nature of eSCO link 24 may comprise an uncorrectable error. Alternatively, the AC and Bluetooth™ header may be protected by FEC and error management module 34 may attempt to correct any bit errors in both the AC and Bluetooth™ header using FEC. In other instances, only the Bluetooth™ header includes FEC and therefore any errors in the AC may comprise an uncorrectable error. In the event an uncorrectable error is detected in the AC and/or H ("NO" 56), error management module 32 interfaces with link management module 30 to signal the uncorrectable error. In response to this uncorrectable error, link management module 30 invokes retransmission module 40 to request retransmission of eSCO packet 42 (58).

If no uncorrectable errors are detected in both of the AC and H, error management module 32 interfaces with link management module 30 to inform link management module 30 that the packet header contains no errors, whereupon link management module 30 writes the packet to buffer 0, e.g., buffer 36A, as packet 42 (57). Error management module 32, meanwhile, proceeds to verify the payload of packet 42 (60). The payload of eSCO packet 42 includes a CRC checksum and error management module 32 may verify this CRC to determine whether the payload has any uncorrectable errors. If error management module 58 determines that received eSCO packet 42 includes no uncorrectable errors ("NO" 61), error management module 32 writes eSCO packet 42 to buffer 44, which may be referred to as an output buffer, whereupon decoding unit 34 decodes eSCO packet 42 and writes the resulting data as a portion of media content 26', as described above (62).

However, if error management module 32 discovers or determines one or more uncorrectable errors in the payload of packet 42 ("YES" 61), error management module 32 interfaces with link management module 30 to signal the uncorrectable error. In response to this uncorrectable error, link management module 32 invokes retransmission module 40 to request retransmission of eSCO packet 42 (58). Link management module 30 may, prior to invoking retransmission module 40 first determine whether timer 46 has "timed out" or otherwise expired. If not timed out, link management module 30 invokes retransmission module 40 to request retransmission of eSCO packet 42. Assuming timer 46 has not timed out, link management module 30 receives eSCO packet 42' in response to the retransmission request (64). Once again, error management module 32 verifies the AC and H of eSCO packet 42' to determine whether eSCO packet 42' contains any uncorrectable errors in the header of packet 42' (66).

As before, if eSCO packet 42' contains no uncorrectable errors ("NO" 68), error management module 32 indicates the lack of errors in the header to link management module 30, which proceeds to write packet 42' to buffer 36B, which is referred to as "buffer 1" in FIG. 3 (69). As before, error management module 32 proceeds to determine if the payload of packet 42' contains any uncorrectable errors by verifying the CRC of the payload (70). If error management module 32 successfully verifies that the payload of packet 42' does not contain any errors using the CRC ("NO" 71), error management module 32 writes packet 42' to buffer 44. Decoding unit 34 then decodes eSCO packet 42' stored to buffer 44 and writes the resulting data as a portion of media content 26' in the manner described above (62).

However, if the payload of eSCO packet 42' contains uncorrectable errors ("YES" 71), error management module 32 interacts with link management module 30 to signal these errors. Link management module 30 once again verifies that timer 46 has not timed out. Considering that the time window defined by timer 46 generally permits two retransmission requests per packet, it is assumed that timer 46 has not yet timed out and link management module 30 therefore invokes retransmission module 40 to once again request retransmission of eSCO packet 42 (72). In response to this retransmission request, link management module 30 receives eSCO packet 42" and forwards packet 42" to error management module 32 (73).

Error management module 32 first verifies the header of eSCO packet 42". More particularly, error management module 32 verifies the AC and the Bluetooth™ header (H) to determine whether the AC and H include any uncorrectable errors (74). If the AC and H include uncorrectable errors ("YES" 75), error management module 32 signals link management module 30 that eSCO packet 42 was lost and instructs packet loss concealment module 35 to perform packet loss concealment, as described above (76, 78). Packet loss concealment module 35 generates the concealed packet data, e.g., the special silence data, and writes this data as media content 26'.

If, however, the AC and H (or, more generally, the header) do not include any uncorrectable errors ("NO" 75), error management module 32 signals the lack of header errors to link management module 30. In response to this signal, link management module 30 writes packet 42" to buffer 36C, which is denoted as "buffer 2" in FIG. 3 (80). Error management module 32 then verifies the payload CRC checksum to determine whether the CRC indicates an uncorrectable error (82, 84). If the CRC checksum indicates an uncorrectable error ("YES" 84), error management module 32 interfaces with link management module 30 to signal the presence of the uncorrectable error.

Link management module 30 then determines whether timer 46 has times out or whether sufficient time remains on timer 46 to enable another retransmission. Given that timer 46 usually only permits two retransmission, link management module 30 determines that timer 46 does not permit another retransmission and instead interfaces with error management module 32 to indicate another retransmission is not possible. In response to this indication from link management module 30, error management module 32 then determines whether packets 42, 42' and 42" are valid or available for use in the majority vote, as described above (86). If uncorrectable bit header errors occurred with respect to one of packets 42, 42' and 42" ("NO" 86), error management module 32 determines that packets 42, 42' and 42" are not valid or otherwise available for use in the majority vote and invokes packet loss concealment unit 35 to perform packet loss concealment, as described above (78).

If all of packets 42, 42' and 42" are determined to be valid ("YES" 86), error management module 32 interfaces with MV module 28 to invoke the majority vote error correction techniques described in this disclosure. MV module 28 then perform the majority vote error correction techniques described above by way of example with respect to Table 1 to generate packet 43 (88). MV module 28 writes this packet to buffer 44 (which may be the same as buffer 36A), whereupon decoding unit 34 decodes packet 43 and stores the resulting data as a portion of media content 26' (60). If the CRC checksum is successfully verified and no uncorrectable errors exist ("NO" 84), error management module 32 writes packet 42" to buffer 44, where decoding unit 34 decodes packet 42" and stores the resulting data as a portion of media content 26' (62).

Figure 4:
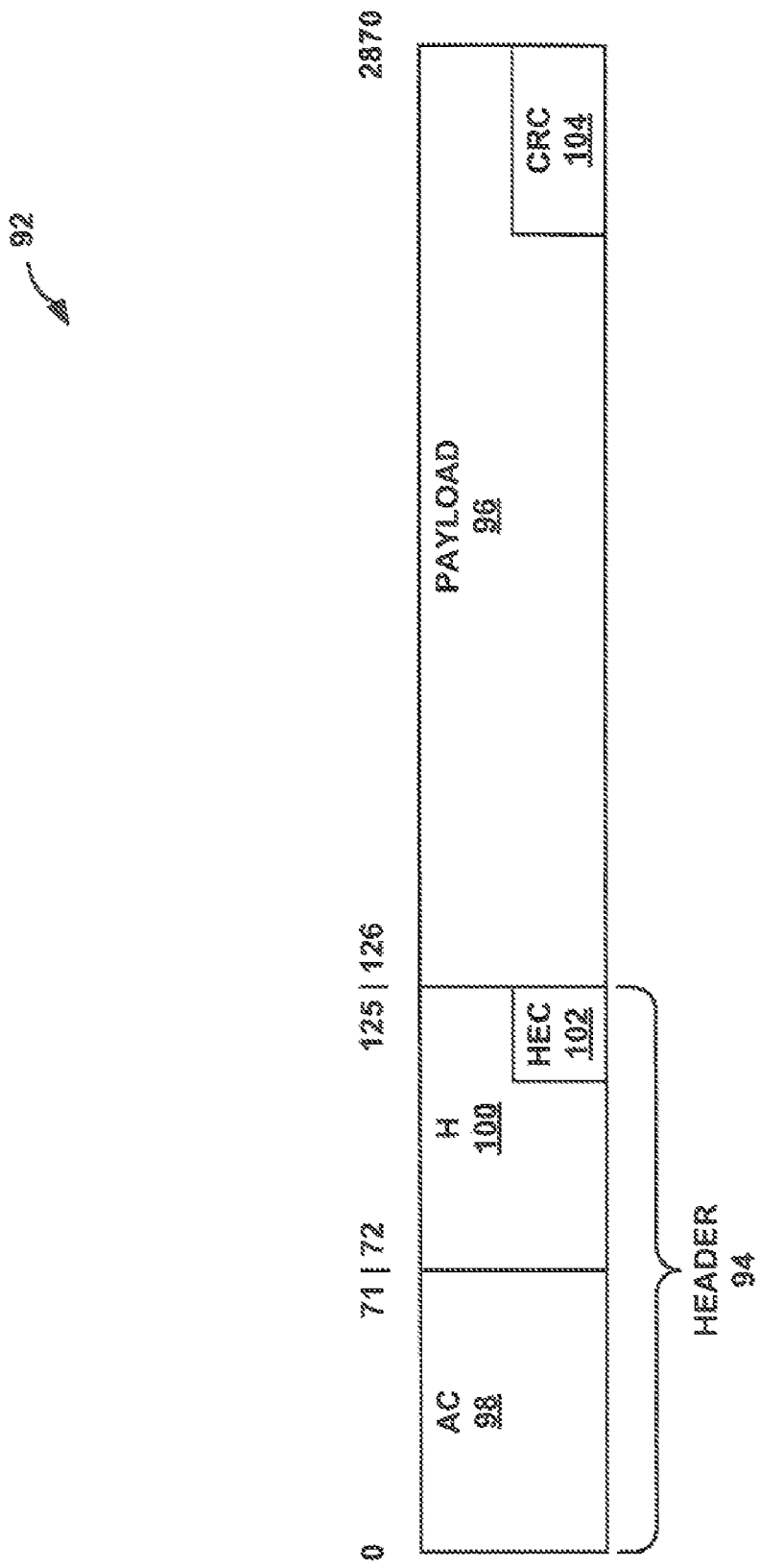
FIG. 4 is a diagram illustrating an example extended synchronous connection oriented (eSCO) packet received and processed by the WPAN device in accordance with the majority vote error correction techniques described in this disclosure.

FIG. 4 is a diagram illustrating an example eSCO packet 92 received and processed by WPAN device 14 in accordance with the majority vote error correction techniques described in this disclosure. Packet 92 includes a header field 94 and a payload field 96. Header field 94 includes an access code field 98 ("AC 98") and a Bluetooth header field 100 ("H 100"). AC field 98 stores information or data defining an access code preamble, a synchronization word and optionally a trailer. Without the optional trailer, AC field 98 comprises the first 68 bits. With the optional trailer, AC field 98 comprises the first 72 bits (e.g., 0-71 bits), which is the configuration shown in FIG. 4. H field 100 stores data defining a number of Bluetooth header parameters, including a logical transport address, a packet type, a flow control bit, an acknowledgment indication, a sequence and an 8-bit header error check 102 ("HEC 102"). Error management module 32 of WPAN device 14 shown in FIG. 2 parses H field 100 to determine HEC 102, which error management module 32 utilizes to perform FEC.

Payload field 96 stores a variable amount of data (e.g., anywhere from 0 to 2745 bits), a majority of which relates to an application utilizing the PAN, such as media content 26. Payload field 96 also stores a 16-bit cyclic redundancy check 104 ("CRC 104"). CRC 104 does not facilitate or otherwise enable error correction, but error management module 32 of WPAN device 14 may parse payload field 96 to determine 104 and then determine whether payload 96 contains uncorrectable errors based on CRC 104. In this manner, eSCO packet 92 provides only for limited forms of error correction in that only H field 100 provides HEC 102 by which error correction may occur, while payload 96 provides CRC 104 through which only error detection may occur. Consequently, eSCO packet 92 comprise a packet having only limited forms of error correction.

Figure 5A:
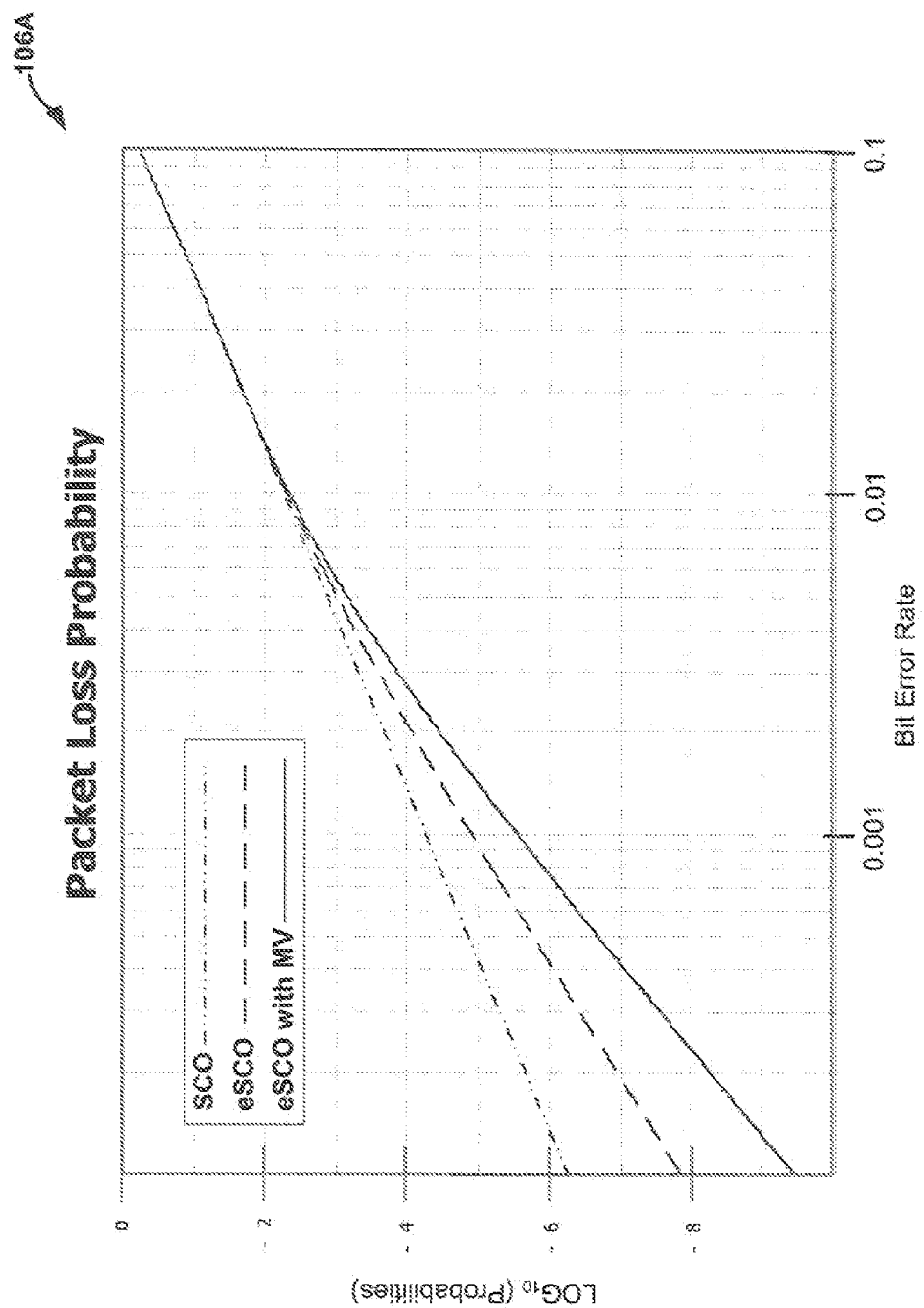
FIGS. 5A and 5B are diagrams illustrating exemplary graphs that respectively demonstrate theoretical reduced bit error rates when employing the techniques of this disclosure.
Figure 5B:
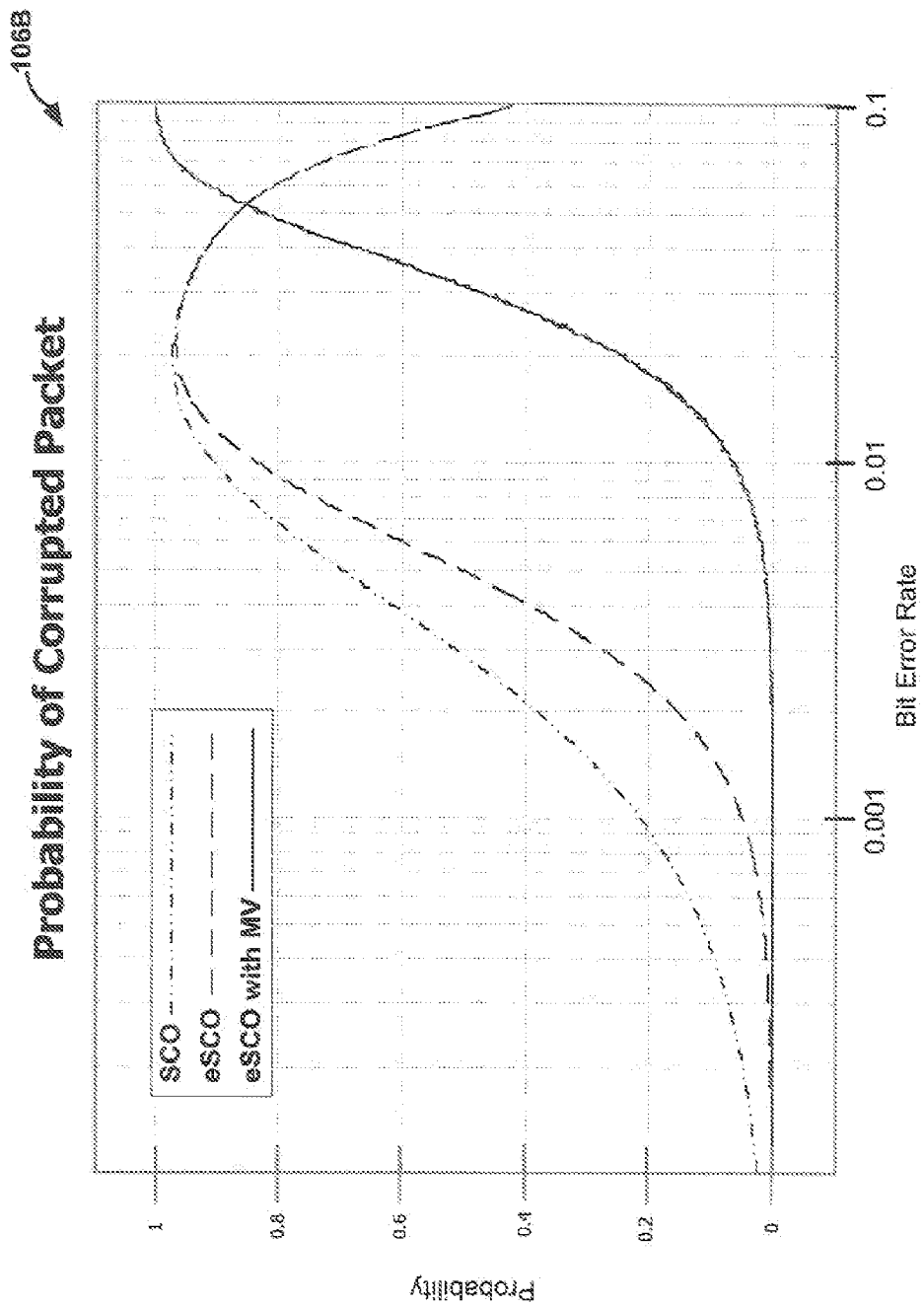

FIGS. 5A and 5B are diagrams illustrating exemplary graphs 106A and 106B that respectively demonstrate theoretical reduced bit error rates when employing the techniques of this disclosure compared to conventional techniques. In particular, graph 106A of FIG. 5A shows a theoretical reduction in the probability of packet loss when a device, such as WPAN device 14, implements eSCO in conjunction with the majority voting (MV) error correction techniques described in this disclosure. Particularly, WPAN device 14 experiences a theoretical reduction in the probability of packet loss with respect to devices that implement either eSCO or SCO.

With respect to FIG. 5B, graph 106B shows a theoretical reduction in the probability of a corrupt packet when a device, such as WPAN device 14, implements eSCO in conjunction with the majority vote (MV) error correction techniques described in this disclosure. Particularly, WPAN device 14 experiences a theoretical reduction in the probability of a corrupt packet when compared to devices that implement either eSCO or SCO, as can be seen by the evident shift in the curve to the right. Both of graphs 106A and 106B illustrate substantive, although theoretical, improvements to transmission of data in noisy mediums, either wired or wireless, that may substantially improve audio or other media playback clarity.

The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset. If implemented in software, the techniques may be realized at least in part by a computer-readable medium comprising instructions that, when executed, cause a processor to perform one or more of the methods described above.

A computer-readable medium may form part of a computer program product, which may include packaging materials. A computer-readable medium may comprise a computer data storage medium such as random access memory (RAM), synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code or instructions may be executed by one or more processors, such as one or more DSPs, general purpose microprocessors, ASICs, field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules. The disclosure also contemplates any of a variety of integrated circuit devices that include circuitry to implement one or more of the techniques described in this disclosure. Such circuitry may be provided in a single integrated circuit chip or in multiple, interoperable integrated circuit chips in a so-called chipset. Such integrated circuit devices may be used in a variety of applications, some of which may include use in wireless communication devices, such as mobile telephone handsets.

Various examples of the disclosure have been described. These and other examples are within the scope of the following claims.

The invention claimed is:

1. A method comprising:
   requesting, with a device, a first retransmission of a first communication received over a synchronous link of a wireless communication medium in response to detecting a first uncorrectable error in the first communication;
   requesting, with the device via the synchronous link, a second retransmission of the first communication in response to detecting a second uncorrectable error in a second communication received via the synchronous link in response to the first retransmission request;
   receiving, with the device via the synchronous link, a third communication in response to the second retransmission request; and
   in response to detecting a third uncorrectable error in the third communication, performing, with the device, a majority vote with respect to the first, second and third communications to generate an error-corrected communication.

2. The method of claim 1, further comprising:
   establishing the synchronous link over the wireless communication medium that communicatively couples the device with another device; and
   receiving the first communication over the synchronous link.

3. The method of claim 2, wherein receiving the third communication via the synchronous link comprises receiving the third communication via the synchronous link without acknowledging the third communication to the other device.

4. The method of claim 1,
   wherein the first communication comprises a first version of an extended synchronous connection oriented (eSCO) packet, wherein the eSCO packet conforms to a Bluetooth specification,
   wherein the second communication comprises a second version of the eSCO packet, and
   wherein the third communication comprises a third version of the eSCO packet.

5. The method of claim 4, further comprising:
   establishing an eSCO link as the synchronous link over the wireless communication medium between the device and another device; and
   receiving the first and second versions of the eSCO packet from the other device over the eSCO link,
   wherein receiving the third communication comprise receiving the third version of the eSCO packet from the other device over the eSCO link, and
   wherein requesting the first and second retransmissions of the first communication comprises requesting each of the first and second retransmissions of the eSCO packet over the eSCO link in accordance with the Bluetooth specification.

6. The method of claim 4,
   wherein the eSCO packet comprises a header field and a payload field,
   wherein the header field stores error correction data that enables detection and correction of bit errors in data stored in the header,
   wherein the payload field stores error detection data that enables detection of bit errors in data stored to the payload field, and
   wherein the first, second and third uncorrectable errors each comprise one or more of a bit error in the data stored to the header field that cannot be corrected using the error correction data and a bit error in the data stored to the payload field detected using the error detection data.

7. The method of claim 6, further comprising:
   determining that the third uncorrectable error comprises the bit error in the data stored to the header field that cannot be corrected using the error correction data;
   discarding the third version of the eSCO packet in response to the determination that the third uncorrectable error comprises the bit error in the data stored to the header field; and
   performing packet loss concealment to replace the discarded third version of the eSCO packet with a special packet designating silence without performing the bit-wise majority vote on corresponding bits of the first, second and third versions of the eSCO packet.

8. The method of claim 6, further comprising:
   determining that the third uncorrectable error comprises the bit error in the data stored to the payload filed detected using the error detection data; and
   determining whether the first, second and third uncorrectable errors are each bit errors in the payload field,
   wherein performing the bit-wise majority vote comprises performing the bit-wise majority vote on corresponding bits of the first, second and third versions of the eSCO packet to generate an error-corrected communication in response to the determination that the first, second and third uncorrectable errors each are the bit error in the data stored to the payload field.

9. The method of claim 1, further comprisingdecoding payload data stored to a payload field of the error corrected communication to generate media content.

10. The method of claim 1, wherein the device comprises a wireless personal area network (WPAN) device that wireless communicates over the wireless communication medium with another WPAN capable device.

11. The method of claim 10,
   wherein the WPAN device comprises a headset, and
   wherein the other WPAN capable device comprises a mobile device.

12. The method of claim 1, wherein performing the majority vote comprises, in response to detecting the third uncorrectable error in the third communication, performing a bit-wise majority vote on a corresponding at least one bit of each of the first, second and third communications to generate the error-corrected communication.

13. A communication device comprising a control unit that includes:
- a link management module to request a first retransmission of a first communication received over a synchronous link of a wireless communication medium in response to detecting a first uncorrectable error in the first communication received via the synchronous link, requests a second retransmission of the first communication via the synchronous link in response to detecting a second uncorrectable error in a second communication received via the synchronous link in response to the first retransmission request and receives a third communication via the synchronous link in response to the second retransmission request; and
- a majority vote module to, in response to detecting a third uncorrectable error in the third communication, perform a majority vote with respect to the first, second and third communications to generate an error-corrected communication.

14. The communication device of claim 13, wherein the link management module includes a pairing module that establishes the synchronous link over the wireless communication medium to communicatively couple the communication device with another device.

15. The communication device of claim 14, wherein the link management module receives the third communication via the synchronous link without acknowledging the third communication to the other device.

16. The communication device of claim 13,
- wherein the first communication comprises a first version of an extended synchronous connection oriented (eSCO) packet, wherein the eSCO packet conforms to a Bluetooth specification,
- wherein the second communication comprises a second version of the eSCO packet, and
- wherein the third communication comprises a third version of the eSCO packet.

17. The communication device of claim 16,
- wherein the link management module includes a pairing module to establish an eSCO link over the wireless communication medium between the device and another device, and
- wherein the link management module receives the first, second and third versions of the eSCO packet from the other device over the eSCO link,
- wherein the link management module includes a retransmission module to request each of the first and second retransmissions of the eSCO packet over the eSCO link in accordance with the Bluetooth specification.

18. The communication device of claim 16,
- wherein the eSCO packet comprises a header field and a payload field,
- wherein the header field stores error correction data that enables detection and correction of bit errors in data stored in the header,
- wherein the payload field stores error detection data that enables detection of bit errors in data stored to the payload field, and
- wherein the first, second and third uncorrectable errors each comprise one or more of a bit error in the data stored to the header field that cannot be corrected using the error correction data and a bit error in the data stored to the payload field detected using the error detection data.

19. The communication device of claim 18, wherein the control unit further includes:

- an error management module to determine that the third uncorrectable error comprises the bit error in the data stored to the header field that cannot be corrected using the error correction data and discard the third version of the eSCO packet in response to the determination that the third uncorrectable error comprises the bit error in the data stored to the header field; and
- a packet loss concealment module that performs packet loss concealment to replace the discarded third version of the eSCO packet with a special packet designating silence without allowing the majority vote module perform the bit-wise majority vote on corresponding bits of the first, second and third versions of the eSCO packet.

20. The communication device of claim 18, wherein the control unit further includes an error management module to determine that the third uncorrectable error comprises the bit error in the data stored to the payload filed detected using the error detection data, determine whether the first, second and third uncorrectable errors are each bit errors in the payload field,
- wherein the majority vote module performs the bit-wise majority vote on corresponding bits of the first, second and third versions of the eSCO packet to generate an error-corrected communication in response to the determination that the first, second and third uncorrectable errors each are the bit error in the data stored to the payload field.

21. The communication device of claim 13, wherein the control unit further comprises a decoding unit to decode payload data stored to a payload field of the error corrected communication to generate media content.

22. The communication device of claim 13, wherein the communication device comprises a wireless personal area network (WPAN) device that wireless communicates over the wireless communication medium with another WPAN capable device.

23. The communication device of claim 22,
- wherein the WPAN device comprises a headset, and
- wherein the other WPAN capable device comprises a mobile device.

24. The communication device of claim 13, wherein the majority vote module, when performing the majority vote, performs, in response to detecting the third uncorrectable error in the third communication, a bit-wise majority vote on a corresponding at least one bit of each of the first, second and third communications to generate the error-corrected communication.

25. A system comprising:
a first wireless personal area network (WPAN) device comprising a control unit that includes:
- a link management module to request a first retransmission of a first communication received over a synchronous link of a wireless communication medium in response to detecting a first uncorrectable error in the first communication received via the synchronous link, requests a second retransmission of the first communication via the synchronous link in response to detecting a second uncorrectable error in a second communication received via the synchronous link in response to the first retransmission request and receives a third communication via the synchronous link in response to the second retransmission; and
- a majority vote module to, in response to detecting a third uncorrectable error in the third communication, perform a bit-wise majority vote on corresponding bits of the first, second and third communications to generate an error-corrected communication, wherein the system also includes a second WPAN device, and wherein the first WPAN device wirelessly communicates over the wireless communication medium with the second WPAN device.

26. The system of claim 25, wherein the first WPAN device comprises a Bluetooth™ headset, and wherein the second WPAN device comprises a mobile device.

27. A non-transitory computer-readable storage medium comprising instructions that, when executed, cause one or more processors to:

request a first retransmission of a first communication received over a synchronous link of a wireless communication medium in response to detecting a first uncorrectable error in the first communication;

request a second retransmission of the first communication via the synchronous link in response to detecting a second uncorrectable error in a second communication received via the synchronous link in response to the first retransmission request;

receive a third communication via the synchronous link in response to the second retransmission; and in response to detecting a third uncorrectable error in the third communication, perform a majority vote with respect to the first, second and third communications to generate an error-corrected communication.

28. The non-transitory computer-readable storage medium of claim 27, wherein the instructions that, when executed, cause the one or more processors to perform a majority vote further comprise instruction that, when executed, cause the one or more processors to, in response to detecting the third uncorrectable error in the third communication, perform a bit-wise majority vote on a corresponding at least one bit of each of the first, second and third communications to generate the error-corrected communication.

29. A communication device comprising:

means for requesting a first retransmission of a first communication received over a synchronous link of a wireless communication medium in response to detecting a first uncorrectable error in the first communication;

means for requesting a second retransmission of the first communication via the synchronous link in response to detecting a second uncorrectable error in a second communication received in response to the first retransmission request;

means for receiving a third communication via the synchronous link in response to the second retransmission; and in response to detecting a third uncorrectable error in the third communication, means for performing a majority vote with respect to the first, second and third communications to generate an error-corrected communication.

30. The communication device of claim 29, wherein the means for performing the majority vote comprise means for performing, in response to detecting the third uncorrectable error in the third communication, a bit-wise majority vote on a corresponding at least one bit of each of the first, second and third communications to generate the error-corrected communication.

* * * * *